United States Patent [19]

Essop et al.

[11] Patent Number: 5,759,390
[45] Date of Patent: *Jun. 2, 1998

[54] PARTICLE SEPARATOR

[76] Inventors: Saleam Essop; Allen G. Bullard, both of P.O. Box 1638, Hillcrest 3650, South Africa

[*] Notice: The term of this patent shall not extend beyond the expiration date of Pat. No. 5,512,171.

[21] Appl. No.: 529,988

[22] Filed: Sep. 19, 1995

Related U.S. Application Data

[63] Continuation of Ser. No. 381,477, Jan. 31, 1995, Pat. No. 5,512,171.

[51] Int. Cl.$^6$ .................. C02F 1/24; C02F 1/465
[52] U.S. Cl. .................. 210/221.2; 210/243; 210/748; 204/672; 204/673; 204/674; 204/275
[58] Field of Search .................. 210/221.2, 243, 210/748, 707; 204/149, 302, 275, 660, 666, 672, 673, 674

[56] References Cited

U.S. PATENT DOCUMENTS

| | | |
|---|---|---|
| 2,823,181 | 2/1958 | Packie et al. |
| 3,035,992 | 5/1962 | Hougen . |
| 3,347,786 | 10/1967 | Baer . |
| 3,429,809 | 2/1969 | Dotts, Jr. . |
| 3,479,281 | 11/1969 | Kikindai . |
| 3,523,891 | 8/1970 | Mehl . |
| 3,543,936 | 12/1970 | Abson . |
| 3,664,951 | 5/1972 | Armstrong . |
| 3,673,065 | 6/1972 | Anderson . |
| 3,756,933 | 9/1973 | Greenberg . |
| 3,767,046 | 10/1973 | Hartkorn . |
| 3,793,178 | 2/1974 | Austin et al. |
| 3,822,204 | 7/1974 | Sako et al. |
| 3,914,164 | 10/1975 | Clark . |
| 3,933,654 | 1/1976 | Middlebeek . |
| 3,959,131 | 5/1976 | Ramirez et al. |
| 3,969,203 | 7/1976 | Ramirez . |
| 3,975,269 | 8/1976 | Ramirez . |
| 4,012,319 | 3/1977 | Ramirez . |
| 4,042,512 | 8/1977 | McCarthey et al. |
| 4,115,279 | 9/1978 | Toft . |
| 4,123,365 | 10/1978 | Middlebeek . |
| 4,179,347 | 12/1979 | Krause . |
| 4,336,141 | 6/1982 | Santora . |
| 4,344,845 | 8/1982 | Pielkenrood . |
| 4,405,459 | 9/1983 | Smith . |
| 4,623,436 | 11/1986 | Umchara . |
| 4,747,948 | 5/1988 | North . |
| 4,915,846 | 4/1990 | Thomas, Jr. et al. |
| 4,919,775 | 4/1990 | Ishigaki . |
| 5,380,417 | 1/1995 | Essop et al. |
| 5,512,171 | 4/1996 | Essop . |

FOREIGN PATENT DOCUMENTS

| | | |
|---|---|---|
| 52-46576 | 4/1977 | Japan . |
| 819065 | 5/1981 | U.S.S.R. |
| 1096231 | 6/1984 | U.S.S.R. |
| 1194846 | 11/1985 | U.S.S.R. |
| 1367208 | 9/1974 | United Kingdom . |

Primary Examiner—Thomas M. Lithgow
Attorney, Agent, or Firm—Phelps Dunbar

[57] ABSTRACT

This invention relates to a separator device for the separation of fine particles from a contaminated liquid. The device utilizes the process of electrolysis to produce small gas bubbles which attach themselves to the fine particles and move the particles to the top of the liquid surface where they can be easily removed. The separation is facilitated by the use of baffles which prevent the formation of convection currents in the body of the separator device, and by inclined plates which direct the rising particles towards the removal point.

13 Claims, 5 Drawing Sheets

PARTICLE SEPARATOR

This application is a continuation of application(s) Ser. No. 08/381,477 filed on Jan. 31, 1995, now U.S. Pat. No. 5,512,171.

BACKGROUND OF THE INVENTION

1. Field of Invention

This invention concerns generally particle separators, and more specifically a particle separator designed for removal of fine particles from a contaminated carrier liquid using small gas bubbles generated using an electrode assembly in combination with electrically charged plates and baffles.

2. Description of Related Art

Many industrial processes result in a liquid stream that is contaminated with small particles of material. These particles may be liquid or solid, with some contaminated streams containing both liquid and solid contaminating particles. Such particles may be undesired by-products of the process, or they may be the desired product of the industrial process which cannot be removed from the process stream by conventional means. In the former instance, it is necessary to remove the undesired by-product from the process stream to facilitate proper disposal of both the by-product and the process stream, particularly when the by-product has hazardous or noxious characteristics. If complete removal of the contaminating by-product can be achieved, then the carrier liquid can often be safely discharged directly into the environment, or at least be subjected to a less expensive treatment scheme. Where the contaminating particles are actually the desired product which has found its way into a waste stream, the benefit of removing such particles from the stream is obvious. Not only is disposal of the waste stream facilitated, as discussed above, but valuable product is recovered, which may be returned to the industrial process. Certain industrial processes may result in contaminated product streams wherein removal of particulate contaminates is needed to purify the product stream.

The conventional approaches to removal of particulate materials from carrier liquids include gravity separation, filtration, and/or centrifugation of the particulates. Each of these methods suffers from mechanical and/or economic limitations. Gravity separation can be a very slow process, depending upon the relative densities of the carrier liquid and the contaminate particles, as well as the size of the contaminate particles. In many instances the physical forces driving the gravity separation process are simply insufficient to achieve adequate separation in a reasonable time, resulting in the need for very long residence times in separation devices or settling ponds.

Many particulate materials simply cannot be effectively filtered out of a carrier liquid. Notably, contaminating immiscible liquid particles generally pass through the filter media along with the carrier liquid. Some contaminating solid particles quickly blind most filter media, making frequent backflushing or replacement of the filter media a necessity, which increases the cost of the filtration process. Centrifugation can effectively remove particles with densities that differ from the carrier liquid, but is of limited effectiveness as the particle density approaches the density of the carrier liquid. In addition, centrifugation involves substantial investment in capital equipment and maintenance of such equipment.

Flocculation of both liquid and solid particulates has been used with some success. However, flocculation processes often suffer from poor removal efficiencies, due in part to the turbulence required to insure adequate contact between the flocculating agent and the contaminating particles. Accordingly, flocculation processes often include substantial settling time in non-turbulent zones for the floc to adequately separate from the carrier liquid-giving the flocculation process the same limitations as gravity separation processes.

It is common in the pulp and paper industry to have a waste stream which is contaminated with fine fibers of product material. Such streams are often subjected to long term gravity separation in settling ponds. However, this method does not retrieve any of the product fiber for recycling into the paper making process. Filtration of the fibers has proven extremely difficult, due to characteristics of the fibers which cause them to quickly blind filter media. Conventional flocculation practices have failed to efficiently remove fibers from such waste streams, for a variety of reasons, including difficulties in contacting the flocculating agent with the fibers, the need for long residence times in quiescent separation zones, and mechanical difficulties in floc removal and handling.

The use of small bubbles of gas as a flocculating agent is well known in the art. Bubbles attach themselves to small contaminate particles and speed their assent to the surface of the carrier liquid. Gas bubbles may be generated by electrolytic means. See for example U.S. Pat. No. 3,429,809 to Dotts, and U.S. Pat. No. 3,969,203 to Ramirez. Problems associated with the use of electrolytically formed bubbles in separation equipment include: 1) The distance between the point at which the bubbles are generated within the carrier liquid and the surface of the carrier liquid may be too great. Bubbles traveling over this distance may be unable to carry the attached small particles, resulting in shearing of the particles from the bubble, and a reduced level of separation, particularly where there is turbulent flow of the carrier liquid; 2) Even distribution of gas bubbles throughout the carrier liquid may not be accomplished due to the electrode arrangement, resulting in incomplete treatment of the carrier liquid; and 3) Similarly, even distribution of contaminated liquid through the separation chamber may not be accomplished due to channeling or other flow patterns which avoid the area containing bubbles, resulting in portions of the carrier liquid not receiving thorough treatment.

It is an object of this invention to overcome the problems associated with the removal of certain types of contaminating particles from carrier liquids by providing a particle separator incorporating an electrolytic plate system. It is a further aim of this invention to provide a particle separator with a flow pattern that requires all of the liquid to be treated to come into contact with the electrolytically produced bubbles. It is yet another object of this invention to provide means for producing bubbles within a particle separator which evenly distributes the bubbles throughout the path of flow of the liquid to be treated. It is another object of this invention to provide a particle separator that minimizes the amount of premature shearing of bubbles from the contaminated particles by minimizing the turbulent flow within the particle separator.

SUMMARY OF THE INVENTION

In accordance with the invention, a separator vessel is provided which defines one or more separator zones. Carrier liquid to be treated enters one end of the separator vessel and exits at the opposite end of the separator vessel after passing through portions of each of the separator zones. The upper surface of each separation zone is comprised of a pair of opposed inclined plates, the upper ends of which define a contaminate removal zone. Located at the bottom portion of the separation zone is an electrode assembly which consists of two electrically charged plates. These plates are parallel to each other and lie generally in planes which are parallel to the general flow of carrier liquid through the separator vessel. The upper electrode plate contains openings which correspond to electrode studs projecting upwardly from the bottom electrode plate.

When electrically charged with opposing charges, the electrode plates produce numerous small bubbles of hydrogen and oxygen (for aqueous carrier fluids), generally 2–10 microns in size. These bubbles flow upward, attaching themselves to contaminate particles and carrying the contaminate particles towards the surface of the carrier fluid. The contaminate particles and attached bubbles are directed upwards toward the contaminate removal zone by the inclined plates which form the upper surfaces of the separation zones.

Within the separation zones are one or more vertically oriented baffle plates which lie in planes generally perpendicular to the plane of flow of carrier liquid through the separator vessel. The baffle plates are located such that the spaces between baffle plates are centered over one or more of the electrode studs and corresponding openings in the upper electrode plate, such that a substantial number of bubbles are directed upward into the spaces between the baffle plates. These baffle plates limit the opportunity for formation of convection currents within the carrier liquid in the separation zone. Such currents could carry contaminate particles away from the surface of the separation zone. The baffle plates extend completely from one side of the separator vessel to the other, such that carrier liquid may not flow around the sides of the baffle plates. The top of each baffle plate does not contact the inclined plates. A gap of approximately 2 inches allows for flow of contaminated particles and bubbles along the underside of each inclined plate, towards the contaminate removal zone of each separation zone. Similarly, the bottom of each baffle plate does not contact the upper electrode plate. A gap between the upper electrode plate and the baffle plates allows carrier liquid to flow along the upper electrode plate. The flow of bubbles upwards from the electrode plate through the carrier liquid results in contaminated particles being carried by adhering bubbles into the spaces between baffle plates, and upwards towards the contaminate removal zone. The contaminated particles and bubbles form a flocculent at the surface of the carrier fluid, which is removed from the contaminate removal zone.

Just below the opening between the inclined plates which forms the contaminate removal zone another baffle arrangement may be placed. This stabilization baffle is located near the point of closest convergence of the inclined plates, and just below the contaminate removal zone. The stabilization baffle has a cross sectional shape of a square, with a corner of the square directed toward the floor of the separator vessel. It extends from one side of the separator vessel to the other, but is not in electrical contact with the sides of the separation vessel. The stabilization baffle may be electrically charged, generating gas bubbles which serve to prevent the formation of convection currents in the central portion of the separation zones. The stabilization baffle further prevents the bombardment and subsequent disturbance of the gathered contaminate particles which have been carried to the contaminate removal zone as a result of rising gas bubbles in the separation zone.

The inclined plates may also be electrically charged, such that bubbles may be formed on the underside of the plates to encourage movement of contaminated particles upwards along the underside of the inclined plates and towards the contaminate removal zone.

The amount and size of the gas bubbles which are generated on the various electrode surfaces may be controlled by regulating the current potential across the electrodes. The amount of bubbles formed may be increased by using a roughened surface on the electrode surface. However, the underside of the inclined plates should be smooth and polished so that gas saturated particles may easily slide and move towards the contaminate particle collection zone. Periodic reversal of the polarity of the electrodes may be required to prevent electroplating.

The objects, features and advantages of the present invention will become apparent to those skilled in the art after a review of the following detailed description taken in conjunction with the accompanying drawings wherein like characters of reference designate like parts throughout the several views.

DETAILED DESCRIPTION OF THE PREFERRED EMBODIMENT

Figure 1:
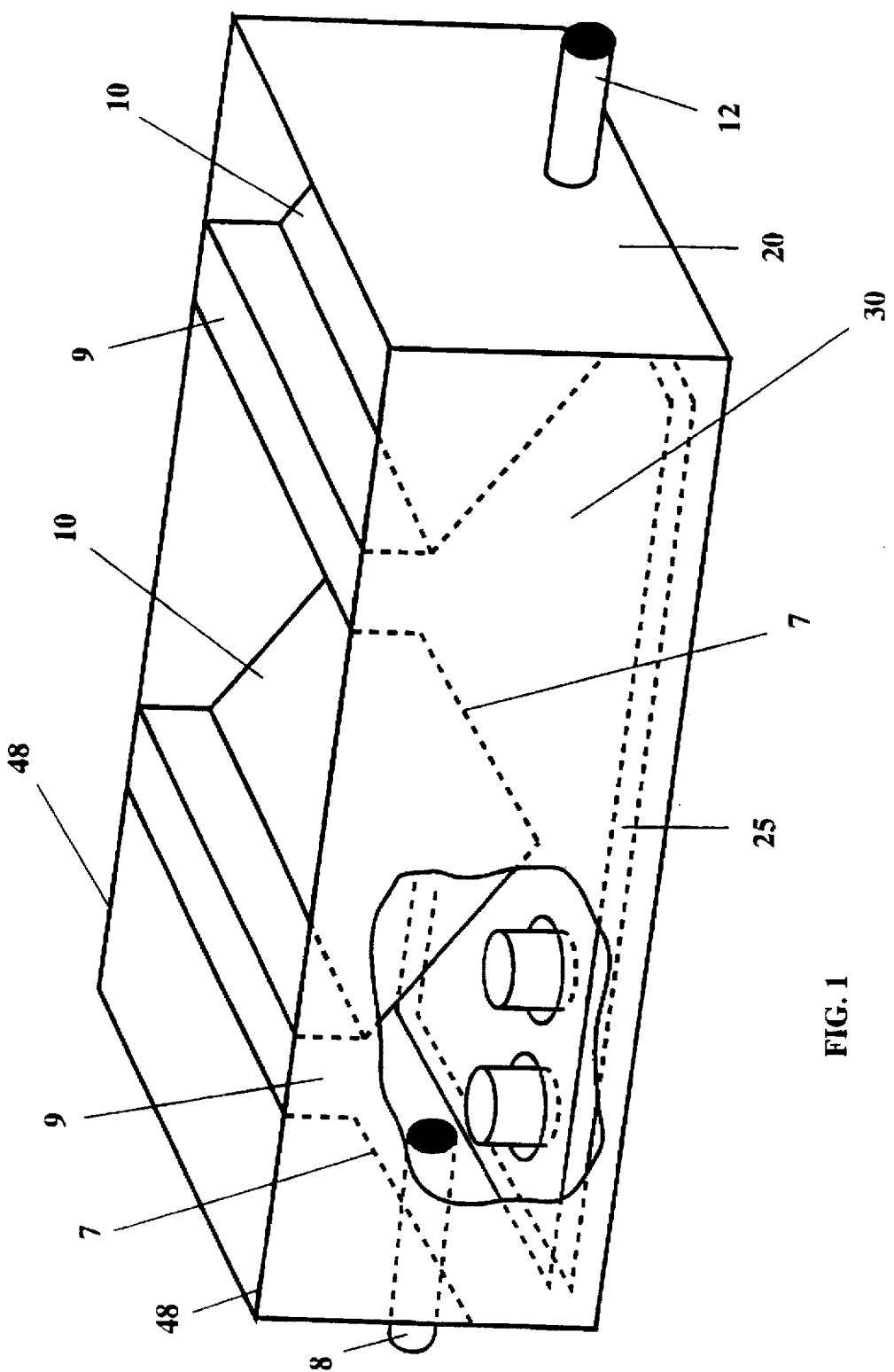
FIG. 1 is a perspective view of the particle separator.

FIG. 1 shows the electrode assembly (25) within the separator vessel (20). Situated within the separator vessel (20) are pairs of opposed converging inclined plates (7 and 10) which define separation zones (30). A separator vessel (20) may contain one or more separation zones (30) defined by inclined plates (7 and 10). Inclined plates (7 and 10) may be electrically charged such that small gas bubbles are formed on the underside of inclined plates (7 and 10). These bubbles (not shown) serve to dislodge any contaminate particles which may accumulate on the underside of plates (7 and 10). The bubbles attach themselves to the contaminate particles, and cause the contaminate particles to rise into the contaminate removal zone (9). Inclined plates (7 and 10) extend across the entire width of the separator vessel (20), and are supported by the separator vessel side walls (48) and end walls (49) (for inclined plates proximate the end wall (49) of the separator vessel (20)). Inclined plates (7 and 10) need to be electrically insulated from the vessel side walls (48) and vessel ends walls (49) if the inclined plates (7 and 10) are to be electrically charged.

Means (not shown) are provided for removing the contaminate particles which gather at the top of the contaminate removal zone (9). The contaminate removal zone (9) is usually open to the atmosphere. Typical removal means would include a skimmer device which is accompanied by a conveyer system or other method (not shown) for transporting the removed contaminated particles away from the separator vessel (20). As is more fully described below, the contaminated material is a flocculent comprised of electrolytically produced bubbles and contaminate particles.

Figure 2:
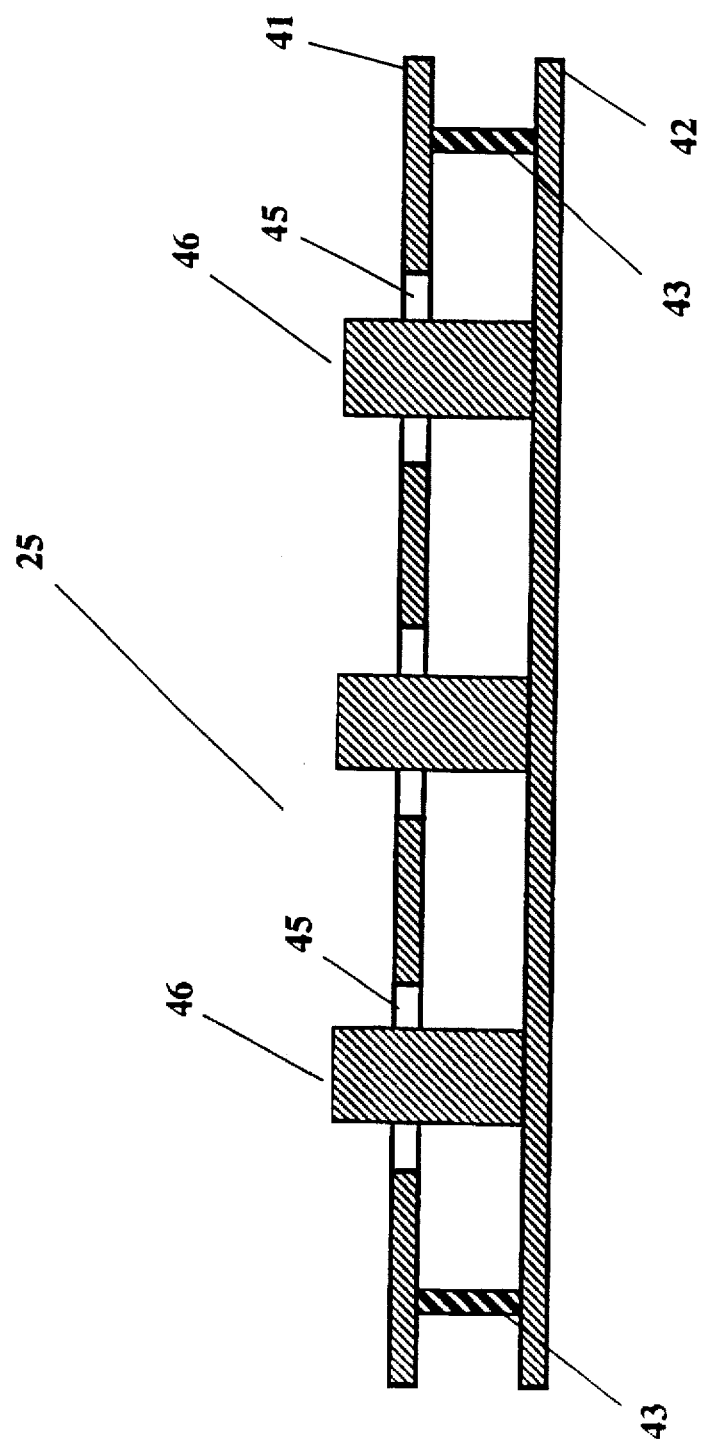
FIG. 2 is a cross sectional view of the electrode assembly of the particle separator.
Figure 3:
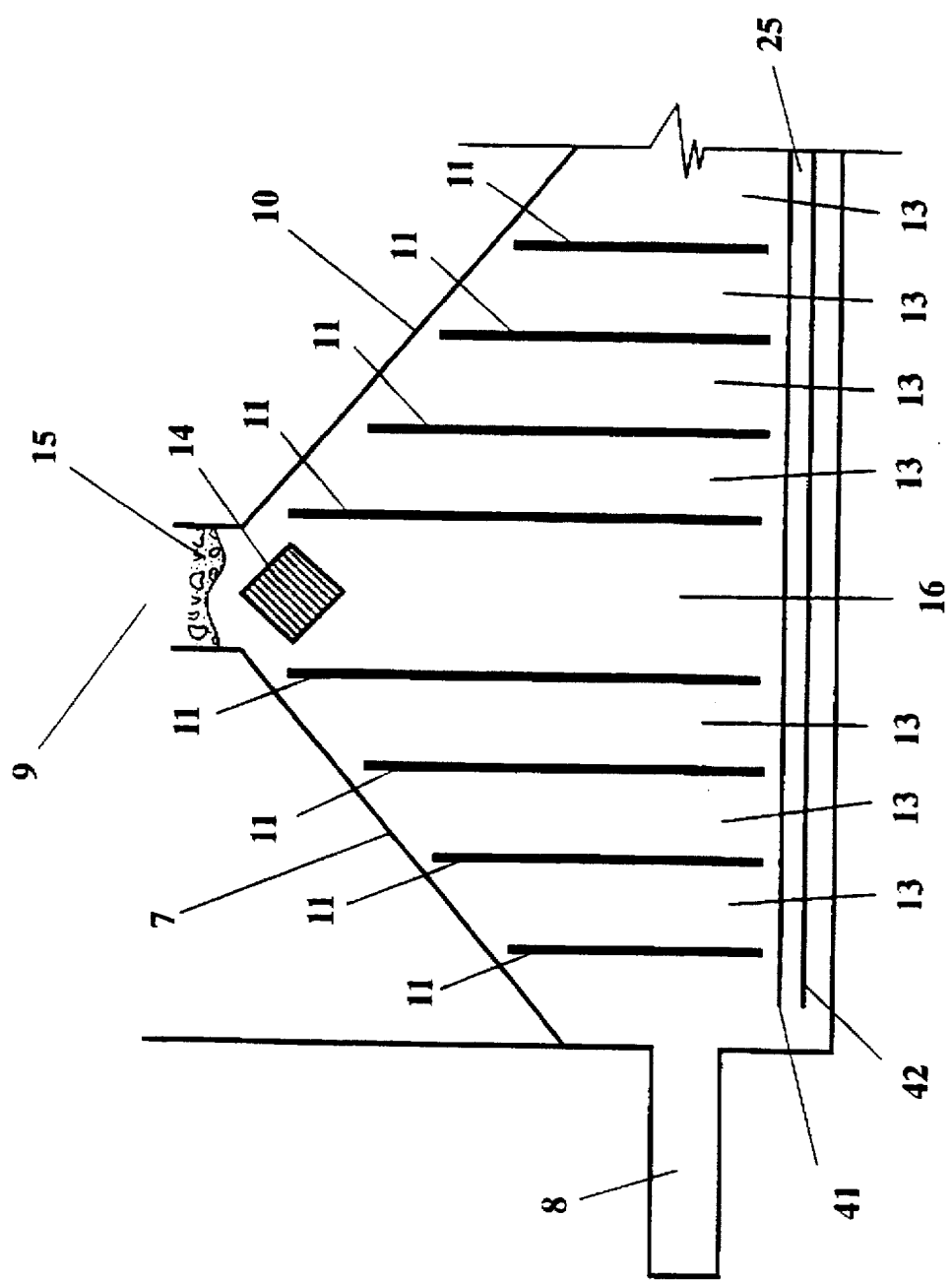
FIG. 3 is a cross sectional view of a separation zone of the particle separator.
Figure 5:
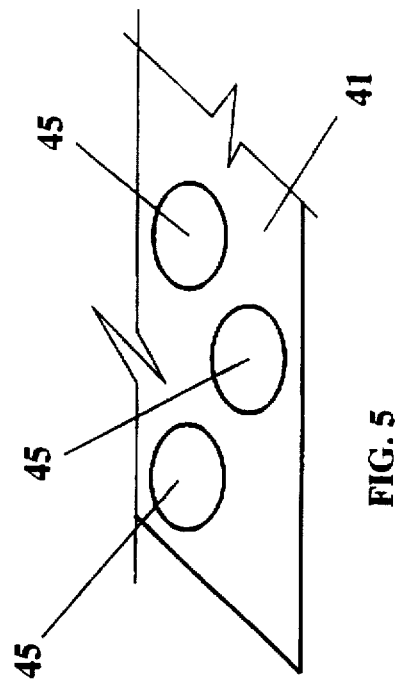
FIG. 5 is a perspective view of the upper electrode plate.
Figure 6:
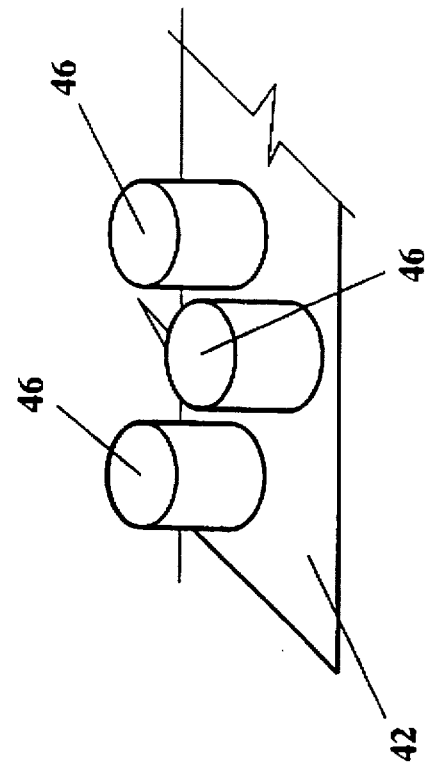
FIG. 6 is a perspective view of the lower electrode plate.

Contaminated carrier liquid enters the separator vessel (20) through inlet pipe (8) and exits the separator vessel (20) through exit pipe (12). As is best shown in FIG. 3, inlet pipe (8) enters the separator vessel (20) below the connection between inclined plate (7) and separator vessel end wall (49), but above electrode assembly (25), which is adjacent the floor of the separator vessel (20). Electrode assembly (25) is shown in greater detail in FIG. 2. The electrode assembly consists of two electrically charged plates (41 and 42) which are separated by insulating pins (43). The insulating pins (43) also serve to properly locate the electrically charged plates (41 and 42) relative to each other. One of the electrically charged plates is negatively charged and the other electrically charged plate is positively charged, resulting in the production of small gas bubbles on the surface of the plates. In addition, one or more electrode studs (46) may be attached to the lower electrically charged plate (42). The electrode studs (46) project upward towards openings (45) in the upper electrically charged plate (41). See FIGS. 5 and 6 showing the upper electrically charged plate (41) and lower electrically charged plate (42) respectively. When electric current is applied between the electrically charged plates (41 and 42), an intensity of micron sized gas bubbles is produced in the area around the electrode studs (46), resulting in a stream of bubbles which move upwardly through the carrier liquid which is flowing across the upper electrically charged plate (41) from the inlet pipe (8) towards the exit pipe (12).

Figure 8:
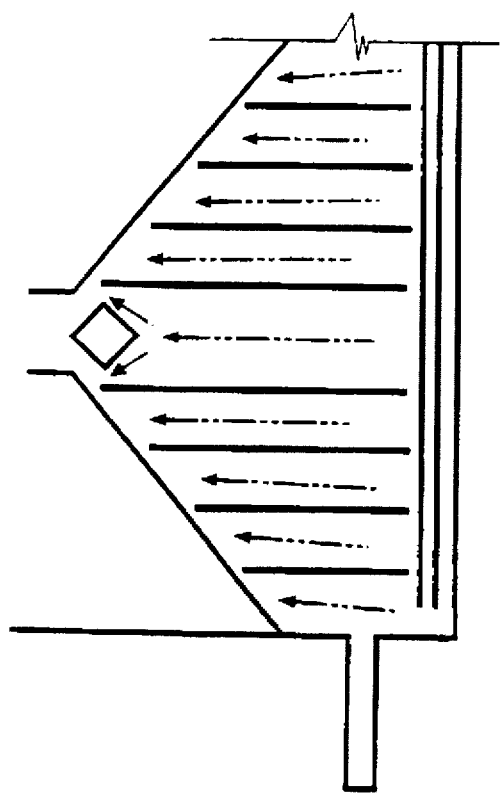
FIG. 8 is a cross sectional view of a separation zone of the particle separator showing how convection currents are suppressed.
Figure 7:
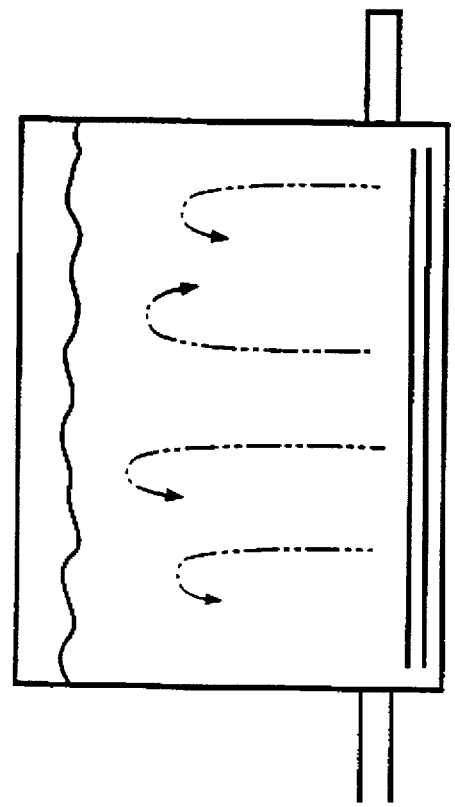
FIG. 7 is a cross sectional view of convection currents (shown as arrows) which occur in conventional electrolytic cell systems.

FIG. 3 shows a cross sectional view of one of the separation zones (30). Vertically oriented baffle plates (11) are provided within the separation zones (30) formed by each pair of opposed converging inclined plates (7 and 10). The baffle plates (11) extend across the entire width of the separator vessel (20), perpendicular to the flow of carrier liquid through the separator vessel (20) from inlet pipe (8) to exit pipe (12). The baffle plates (11) act in conjunction with inclined plates (7 and 10) to prevent the formation of convection currents within the separator zones (30) which may be caused by the passage of carrier liquid and rising gas bubbles. FIG. 7 shows a cross sectional view of convection currents (shown as arrows) which are set up in a conventional electrolytic cell system not containing baffle plates. The convection currents tend to defeat the movement of contaminate particles to the contaminate removal zones (9). As shown in FIG. 8, a separation zone (30) with baffle plates (11) prevents such convection currents from forming, by establishing narrow spaces between the baffle plates (11). Movement of contaminate particles and bubbles (shown by arrows) maintain an upward path of travel.

The heights of the baffle plates (11) follow the general slope of inclined plates (7 and 10), although the top of each baffle plate (11) stops approximately two inches from the inclined plates (7 and 10). This gap is adequate to allow flocculated material to pass along the underside of the inclined plates (7 and 10) and progress towards the contaminate removal zone (9). The baffle plates (11) are attached to and are supported by the sides walls (48) of the separator vessel (20). The baffle plates (11) do not extend downward all the way to the upper electrode plate (41), but rather a gap between the baffle plates (11) and the upper electrode plate (41) is maintained in order to permit the passage of liquid across the upper electrode plate (41).

As is best shown in FIG. 3, a stabilization baffle (14) is located near the point of closest convergence of the inclined plates (7 and 10), and just below the contaminate removal zone (9). The stabilization baffle (14) has a cross sectional shape of a square, with a corner of the square directed toward the floor of the separator vessel (20). The stabilization baffle (14) may be electrically charged, generating gas bubbles which serve to prevent the formation of convection currents in the central portion (16) of the separation zones (30). The stabilization baffle (14) further prevents the bombardment and subsequent disturbance of the gathered flocculent (15) which has been carried to the contaminate removal zone (9) as a result of rapidly rising gas bubbles in the separation zone (30). Stabilization baffle (14) extends across the separation vessel (20) and is supported by separation vessel side walls (48), but must be electrically insulated from separator vessel side walls (48) if the stabilization baffle (14) is to be electrically charged.

Figure 4:
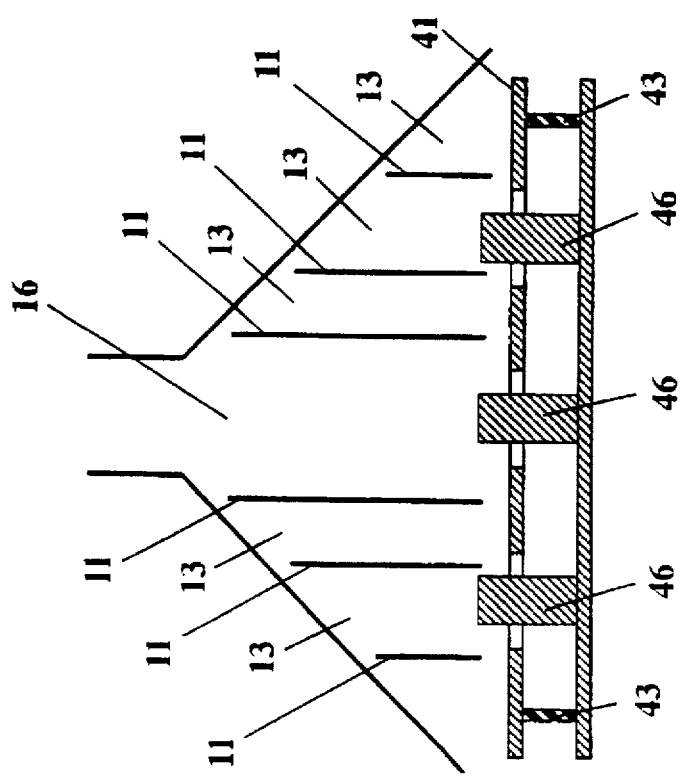
FIG. 4 is a cross sectional view of a separation zone of the particle separator showing the relative positions of the baffle plates and electrode studs.

FIG. 4 shows the relative positions of the baffle plates (11) and electrode studs (46). The electrode studs (46) protrude through openings (45) in the upper electrode plate (41). The electrode studs (46) are aligned such that they are centrally located in the spaces (13 and 16) created by the baffle plates (11). This provides for a concentrated flow of micron sized gas bubbles rising from the electrode stud (46) up through the spaces (13 and 16) between the baffle plates (11). Placement of the electrode studs (46) and openings (45) should be such that the carrier liquid flowing across the upper electrically charged plate (41) cannot traverse the full length of the electrode assembly (25) without being subjected to an intense stream of bubbles.

A typical use of the particle separator involves treatment of waste water streams of the pulp and paper industry containing small particles of fiber. This fiber, if recovered, can be returned to the industrial process and ultimately end up as valuable product. An aqueous stream containing fiber enters the separator vessel (20) via inlet pipe (8) and flows across the electrode assembly (25), which is producing numerous small bubbles of oxygen and hydrogen, generally 2 to 10 microns in size. These bubbles attach themselves to the fiber particles and carry them upwards into the separation zone (30). Placement of baffle plates (11) defining narrowed spaces (13 and 16) in the separation zone (30) limit the creation of convection currents in the separation zone (30). Quantities of fibers and bubbles make their way upwards, ultimately reaching the underside of an inclined plate (7 and 10), where bubbles forming on the underside of the inclined plates (7 and 10) further encourage the movement of the flocculated material towards the contaminate removal zone (9). Fiber and bubbles located in the central space (16) do not reach an inclined plate (7 and 10) but rather proceed directly towards the contaminate removal zone (9). Bubbles formed on the stabilization baffle (14) encourage passage of flocculated material around the stabilization baffle (14) and into the contaminate removal zone (9). The stabilization baffle (14) prevents flocculent in the contaminate removal zone from being subjected to forces which may tend to remove fiber from the flocculent, or break up the flocculent.

Placement of the electrode studs (46) and upper electrically charged plate openings (45) in line with the spaces (13 and 16) between baffle plates (11) focuses an intensity of bubbles on the carrier fluid in a manner which efficiently encourages fiber into the separation zones (30) where it can progress toward the contaminate removal zone (9). A series of separation zones (30) results in a high degree of removal of fiber. The carrier liquid carries less fiber as it moves across the electrode assembly (25) toward the exit pipe (12). The degree of removal of fiber can be adjusted by varying the flow rate through he separation vessel (20), and by adjusting the rate of bubble production. The current potential across each electrically charged surface can be adjusted to give the best rate of bubble production. Sizing of the separator vessel (20) will depend upon desired throughput. Flow of carrier liquid across the electrode assembly (25) must not be so turbulent as to prevent bubbles from attaching to fibers and moving the fibers into the separation zones (30).

Reversing the polarity of the electrically charged surfaces may be needed to prevent electroplating and sacrifice of the positive electrodes. As the flocculated fiber and bubbles fills the contaminate removal zone (9), it is removed by use of a skimmer device in conjunction with a conveyer system to move the flocculent away from the separator vessel (20).

While the invention has been described with respect to a preferred physical embodiment constructed in accordance therewith, it will be apparent to those skilled in the art that modifications and improvements may be made without departing from the scope and spirit of the invention. It is therefore to be understood that within the scope of the appended claims, the invention may be practiced otherwise than as specifically described.

What we claim is:

1. A particle separator device for separating particles from a carrier liquid, comprising, a separator vessel, one or more separation zones formed within said separator vessel by one or more pairs of opposed converging inclined plates, a contaminate removal zone located just above each of said one or more separation zones, and proximate the points of closest convergence of each of said one or more pairs of opposed converging inclined plates, means for removing contaminate particles from each of said contaminate removal zones, inlet means for introducing contaminated liquid into one end of said separator vessel, exit means for removing purified liquid from the end of said separator vessel opposite said inlet means, an electrode assembly located in said separator vessel below the lower ends of said one or more pairs of opposed converging inclined plates, means for electrically charging said electrode assembly, whereby an intensity of micron sized gas bubbles are produced, and a stabilization baffle located near the points of closest convergence of each of said one or more pairs of opposed converging inclined plates and just below each of said contaminate removal zones.

2. A particle separator device according to claim 1, wherein said stabilization baffle extends the entire width of said separation vessel, and further wherein said stabilization baffle has a cross sectional shape of a square, with a corner of the square directed toward the base of said separator vessel.

3. A particle separator device for separating particles from a carrier liquid, comprising, a separator vessel, one or more separation zones formed within said separator vessel by one or more pairs of opposed converging inclined plates, a contaminate removal zone located just above each of said one or more separation zones, and proximate the points of closest convergence of each of said one or more pairs of opposed converging inclined plates, means for removing contaminate particles from each of said contaminate removal zones, inlet means for introducing contaminated liquid into one end of said separator vessel, exit means for removing purified liquid from the end of said separator vessel opposite said inlet means, an electrode assembly comprised of upper and lower electrode plates, located in said separator vessel below the lower ends of said one or more pairs of opposed converging inclined plates, wherein said upper electrode plate is formed with one or more openings, with said lower electrode plate having one or more electrode studs which protrude upwardly towards said openings in said upper electrode plate, and whereby an intensity of micron sized gas bubbles are produced proximate said electrode studs when said upper and lower electrode plates are electrically charged, and means for electrically charging said electrode assembly.

4. A particle separator device according to claim 3, further comprising one or more vertically oriented baffle plates located in said one or more separation zones, and wherein said one or more baffle plates are located such that said one or more electrode studs are centrally located in the spaces between said baffle plates.

5. A particle separator device according to claim 4, wherein said one or more vertically oriented baffle plates lie in planes that are perpendicular to the flow path of carrier liquid from said inlet means to said outlet means.

6. A particle separator device for separating particles from a carrier liquid, comprising, a separator vessel, one or more separation zones formed within said separator vessel by one or more pairs of opposed converging inclined plates, a contaminate removal zone located just above each of said one or more separation zones, and proximate the points of closest convergence of each of said one or more pairs of opposed converging inclined plates, means for removing contaminate particles from each of said contaminate removal zones, inlet means for introducing contaminated liquid into one end of said separator vessel, exit means for removing purified liquid from the end of said separator vessel opposite said inlet means, an electrode assembly located in said separator vessel below the lower ends of said one or more pairs of opposed converging inclined plates, means for electrically charging said electrode assembly, whereby an intensity of micron sized gas bubbles are produced, and means for electrically charging said one or more pairs of opposed converging inclined plates whereby gas bubbles are formed on the underside of said one or more pairs of opposed converging inclined plates.

7. A particle separator device for separating particles from a carrier liquid, comprising, a separator vessel, one or more separation zones formed within said separator vessel by one or more pairs of opposed converging inclined plates, a contaminate removal zone located just above each of said one or more separation zones, and proximate the points of closest convergence of each of said one or more pairs of opposed converging inclined plates.

means for removing contaminate particles from each of said contaminate removal zones.

inlet means for introducing contaminated liquid into one end of said separator vessel.

exit means for removing purified liquid from the end of said separator vessel opposite said inlet means.

an electrode assembly located in said separator vessel below the lower ends of said one or more pairs of opposed converging inclined plates.

a stabilization baffle located near the points of closest convergence of each of said one or more pairs of opposed converging inclined plates and just below each of said contaminate removal zones.

means for electrically charging said electrode assembly, whereby an intensity of micron sized gas bubbles are produced, and means for electrically charging said stabilization baffles whereby gas bubbles are formed on said stabilization baffles.

8. A particle separator device for separating particles from a carrier liquid, comprising, a separator vessel, one or more separation zones formed within said separator vessel by one or more pairs of opposing converging inclined plates which extend the entire width of said separator vessel, a contaminate removal zone located just above each of said one or more separation zones, and proximate the points of closest convergence of each of said one or more pairs of opposed converging inclined plates, means for removing contaminate particles from each of said contaminate removal zones, inlet means for introducing contaminated liquid into one end of said separator vessel, exit means for removing purified liquid from the end of said separator vessel opposite said inlet means, an electrode assembly comprised of upper and lower electrode plates, said upper electrode plate formed with one or more openings, said lower electrode plate having one or more electrode studs which protrude upwardly towards said openings in said upper electrode plate, said electrode assembly being located in said separator vessel below the lower ends of said one or more pairs of opposed converging inclined plates, one or more vertically oriented baffle plates located in said one or more separation zones, said baffle plates being located such that said one or more electrode studs are centrally located in the spaces between said baffle plates, a stabilization baffle located near the points of closest convergence of each of said one or more pairs of opposed converging inclined plates and just below each of said contaminate removal zones, means for electrically charging said upper and lower electrode plates, whereby an intensity of micron sized gas bubbles are produced proximate said one or more electrode studs, means for electrically charging said one or more pairs of opposed converging inclined plates whereby gas bubbles are formed on the underside of said one or more pairs of opposed converging inclined plates, and means for electrically charging said stabilization baffles whereby gas bubbles are formed on said stabilization baffles.

9. A particle separator device according to claim 8, wherein said one or more vertically oriented baffle plates lie in planes that are perpendicular to the flow path of carrier liquid from said inlet means to said outlet means.

10. A particle separator device according to claim 9, wherein said one or more vertically oriented baffle plates extend the entire width of said separator vessel.

11. A particle separator device according to claim 8, wherein said lower electrode plate is located proximate the base of said separator vessel, such that all of the carrier liquid flowing from said inlet means to said outlet means of said separator vessel must pass above said lower electrode plate, whereby all of the carrier liquid is subjected to an intensity of micron sized gas bubbles when said electrode plates are electrically charged.

12. A particle separator device according to claim 8, further comprising means for reversing the polarity of said upper and lower electrode plates, of said one or more pairs of opposed converging inclined plates, and of said stabilization baffles to prevent electroplating and subsequent sacrifice of the positive electrodes.

13. A particle separator device according to claim 8, further comprising means for controlling the current potential across said upper and lower electrode plates, across said one or more pairs of opposed converging inclined plates, and across said stabilization baffles whereby the size and number of gas bubbles can be regulated.

* * * * *